(12) United States Patent
Goteti et al.

(10) Patent No.: US 9,510,363 B2
(45) Date of Patent: Nov. 29, 2016

(54) TRANSMISSION SCHEDULING OPTIMIZATION METHOD AND WIRELESS USER EQUIPMENT DEVICE

(75) Inventors: Anil Kumar Goteti, Evanston, IL (US); Amit P. Butala, Sunnyvale, CA (US); Feng Lu, Santa Clara, CA (US); Harish Venkatachari, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 527 days.

(21) Appl. No.: 13/451,698

(22) Filed: Apr. 20, 2012

(65) Prior Publication Data

US 2012/0201181 A1 Aug. 9, 2012

Related U.S. Application Data

(63) Continuation of application No. 12/252,192, filed on Oct. 15, 2008, now Pat. No. 8,175,100.

(51) Int. Cl.
*H04W 72/12* (2009.01)

(52) U.S. Cl.
CPC .................. *H04W 72/1268* (2013.01)

(58) Field of Classification Search
USPC ......... 370/311, 336–337, 395.4–395.43, 474
See application file for complete search history.

(56) References Cited

U.S. PATENT DOCUMENTS

| | | |
|---|---|---|
| 6,671,260 B1 | 12/2003 | Engstrand |
| 6,879,561 B1 | 4/2005 | Zhang et al. |
| 6,882,642 B1 | 4/2005 | Kejriwal et al. |
| 6,920,128 B1 | 7/2005 | Haugli et al. |
| 7,178,089 B1 | 2/2007 | Frenger et al. |
| 7,251,497 B2 | 7/2007 | Jalloul et al. |
| 7,508,861 B2 | 3/2009 | Kanterakis et al. |
| 7,639,617 B2 | 12/2009 | Chapman et al. |

(Continued)

FOREIGN PATENT DOCUMENTS

| | | |
|---|---|---|
| CN | 1917409 A | 2/2007 |
| EP | 1089498 A2 | 4/2001 |

(Continued)

OTHER PUBLICATIONS

3GPP TR 25.903 v7.0.0 ,"3rd Generation Partnership Project; Technical Specification Group Radio Access Network; Continuous connectivity for packet data users (Release 7)" 3GPP,Mar. 22, 2007, pp. 8-11, 32-34, URL, http://www.3gpp.org/ftp/Specs/latest/Rel-7/25_series/25903-700.zip.

(Continued)

*Primary Examiner* — Hassan Kizou
*Assistant Examiner* — Ashil Farahmand
(74) *Attorney, Agent, or Firm* — Kristine U. Ekwueme

(57) ABSTRACT

A wireless user equipment device transmits a control channel and a data channel. Each of the control channel and the data channel include a plurality of time slots. The control channel is configured to transmit control information and includes both transmission time slots and non-transmission time slots. The data channel is configured to transmit data packets. The device further includes a processor configured to schedule at least one data packet for transmission in at least one data channel time slot that is concurrent to at least one control channel transmission time slot, and a transmission module configured to transmit the at least one data packet in the at least one data channel time slot that is concurrent to the at least one control channel transmission time slot.

20 Claims, 10 Drawing Sheets

(56) References Cited

U.S. PATENT DOCUMENTS

| | | | |
|---|---|---|---|
| 8,175,100 B2 | 5/2012 | Goteti et al. | |
| 2005/0018638 A1* | 1/2005 | Lindskog et al. | 370/338 |
| 2005/0058154 A1 | 3/2005 | Lee et al. | |
| 2005/0143117 A1 | 6/2005 | Jalloul et al. | |
| 2005/0265397 A1 | 12/2005 | Chapman et al. | |
| 2005/0285803 A1* | 12/2005 | Iacono et al. | 343/702 |
| 2006/0268936 A1* | 11/2006 | Hong et al. | 370/474 |
| 2007/0121535 A1* | 5/2007 | Chen et al. | 370/317 |
| 2008/0062951 A1 | 3/2008 | Kanterakis et al. | |

FOREIGN PATENT DOCUMENTS

| | | |
|---|---|---|
| JP | 2004193761 A | 7/2004 |
| JP | 2004328498 A | 11/2004 |
| JP | 2006014304 A | 1/2006 |
| JP | 2008537399 A | 9/2008 |
| WO | 2006114701 A2 | 11/2006 |

OTHER PUBLICATIONS

European Search Report—EP12005595—Search Authority—Munich—Nov. 16, 2012.

3GPP TS 25.211 V7.6.0 (May 2008). 3rd Generation Partnership Project; Technical Specification Group Radio Access Network: Physical channels and mapping of transport channels onto physical channels (FDD) (Release 7).

3GPP TS 25.212 V7.8.0 (May 2008). 3rd Generation Partnership Project; Technical Specification Group Radio Access Network; Multiplexing and channel coding (FDD) (Release 7).

3GPP TS 25.213 V7.5.0 (May 2008), 3rd Generation Partnership Project; Technical Specification Group Radio Access Network; Spreading and modulation (FDD) (Release 7).

3GPP TS 25.214 V7.9.0 (May 2008), 3rd Generation Partnership Project; Technical Specification Group Radio Access Network; Physical layer procedures (FDD) (Release 7).

International Preliminary Report on Patentability—PCT/US2009/060885, The International Bureau of WIPO—Geneva, Switzerland, Nov. 10, 2010.

International Search Report and Written Opinion—PCT/US2009/060885, International Searching Authority—European Patent Office, Apr. 27, 2010.

Partial International Search Report—PCT/US2009/060885, International Search Authority—European Patent Office—Mar. 2, 2010.

* cited by examiner

TRANSMISSION SCHEDULING OPTIMIZATION METHOD AND WIRELESS USER EQUIPMENT DEVICE

CROSS REFERENCE TO RELATED APPLICATIONS

This application is a continuation of and claims priority to U.S. application Ser. No. 12/252,192, filed Oct. 15, 2008, now U.S. Pat. No. 8,175,100 entitled "TRANSMISSION SCHEDULING OPTIMIZATION METHOD AND WIRELESS USER EQUIPMENT DEVICE."

BACKGROUND

Field

The present disclosure generally relates to wireless transmission and, in particular, relates to a transmission scheduling optimization method and wireless user equipment device.

Background

Wireless communications systems typically include portable wireless devices that share at least one thing in common: the requirement of a portable power source. The amount of time that a portable wireless device may spend before recharging or changing power sources is dependent upon many factors, including the requirements of the wireless communications system employed, and the imposition of control parameters upon the portable wireless device by the communications system. Wireless communications systems use various methods that enable the transfer of data and voice information between at least two points. In a wireless communication system employing a Code Division-Multiple Access (CDMA) scheme, one scheduling method assigns a mobile terminal specific set of codes. A base station (BS) implements the channel code associated with the mobile terminal to enable exclusive communication between the BS and the mobile terminal.

Some standards provide dedicated channels for the transmission of data from a mobile terminal to a BS. For instance, the following 3GPP standards each provide such dedicated data channels: the 25.211 standard (version 7.6.0, entitled 'Physical Channels and Mapping of Transport Channels onto Physical Channels'), the 25.212 standard (version 7.8.0, entitled 'Multiplexing and Channel Coding'), the 25.213 standard (version 7.5.0, entitled 'Spreading and Modulation'), and the 25.214 standard (version 7.9.0, including section 6.C, entitled 'Physical Layer Procedures'). Under these standards, the BS is referred to as a 'Node B,' and the mobile terminal is referred to as 'user equipment.' User equipment may be provided with a dedicated data channel known as an 'Enhanced Uplink' for transmitting data from the user equipment to Node B. The Enhanced Uplink includes a transmission of at least one control channel along with the dedicated data channel. The at least one control channel has predetermined transmission periods and predetermined non-transmission periods. The bandwidth of the Enhanced Uplink is monitored and controlled by Node B. Node B sets transmission bandwidth and transmission power requirements for all user equipment coupled to the node within parameters set by the wireless communication method employed.

Because the Enhanced Uplink is a dedicated data channel, users may utilize their user equipment for indiscriminate and/or practically continual data transmission. However, such usage unnecessarily drains the user equipment's portable power source, thereby unnecessarily limiting the length of time that a piece of user equipment may be used before the need to recharge or change power sources. Regardless of the type of wireless standard implemented, the ability to effectively manage transmission power from the user equipment is crucial. The embodiments presented herein address these issues.

SUMMARY

In accordance with exemplary embodiments, methods and devices for wireless transmission are provided. In certain exemplary embodiments, a device and method are provided for optimizing wireless transmission from a user equipment device by scheduling data packets for transmission in data channel time slots that are concurrent to predetermined control channel time slots configured to transmit control information. The control channel includes time slots that have been predetermined for transmission of control information and time slots where nothing is transmitted. By having the data channel transmit during data channel time slots that are concurrent to predetermined control channel time slots configured to transmit control information, transmit power and system resources are saved by virtue of the fact that transmission on the dedicated data channel may cease and/or be limited during the period where nothing is being transmitted on the control channel.

According to an embodiment, a method of optimizing transmissions is provided for a wireless terminal that transmits a control channel and a data channel, each of the control channel and the data channel including a plurality of time slots, the method including scheduling at least one data packet for transmission in at least one data channel time slot concurrent to at least one predetermined control channel time slot configured to transmit control information, and transmitting the at least one data packet in the at least one data channel time slot that is concurrent to the at least one predetermined control channel time slot configured to transmit control information.

According to an embodiment, a method of optimizing transmissions is provided for a wireless terminal that transmits data packets within at least one of a plurality of time slots, the method including splitting a data packet into two or more sub packets, scheduling each of the two or more sub packets for transmission in separate time periods, and transmitting the two or more sub packets in the separate time periods, wherein an energy level needed to transmit the two or more sub packets in the separate time periods is less than an energy level needed to transmit the data packet before it is split.

According to an embodiment, a machine-readable medium having machine-executable instructions for execution by a processor is provided for optimizing transmissions from a wireless terminal that transmits a control channel and a data channel, each of the control channel and the data channel comprising a plurality of time slots, the executed instructions performing steps including scheduling at least one data packet for transmission in at least one data channel time slot concurrent to at least one predetermined control channel time slot configured to transmit control information, and transmitting the at least one data packet in the at least one data channel time slot that is concurrent to the at least one predetermined control channel time slot configured to transmit control information.

According to an embodiment, a machine-readable medium having machine-executable instructions is provided for execution by a processor for optimizing transmissions from a wireless terminal that transmits data packets within at least one of a plurality of time slots, the executed instructions performing steps including splitting a data packet into two or more sub packets, scheduling each of the two or more sub packets for transmission in separate time periods, and transmitting the two or more sub packets in the separate time periods, wherein an energy level needed to transmit the two or more sub packets in the separate time periods is less than an energy level needed to transmit the data packet before it is split.

According to an embodiment, a wireless terminal device is provided for optimizing transmissions. The device transmits a control channel and a data channel, each of the control channel and the data channel comprising a plurality of time slots. The device includes means for scheduling at least one data packet for transmission in at least one data channel time slot concurrent to at least one predetermined control channel time slot configured to transmit control information, means for storing the at least one data packet for transmission, and means for transmitting the at least one data packet in the at least one data channel time slot that is concurrent to the at least one predetermined control channel time slot configured to transmit control information.

According to an embodiment, a wireless terminal device is provided for optimizing transmissions. The device transmits a data channel comprising a plurality of time slots. The device includes means for processing at least one data packet using a selector, the selector comprising an input port and an output port, the selector configured to receive the at least one data packet through the input port from a machine-readable medium, to split the at least one data packet into two or more sub packets based on an instruction from the processor, and to send, through the output port, each of the two or more sub packets to at least one of a plurality of queues, the at least one of a plurality of queues configured to store the two or more sub packets. The device also includes means for transmitting the two or more sub packets in separate time periods wherein an energy level needed to transmit the two or more sub packets in the separate time periods is less than an energy level needed to transmit the at least one data packet in one time period before it is split.

According to an embodiment, a wireless terminal device is provided for optimizing transmissions. The device transmits a control channel and a data channel, each of the control channel and the data channel comprising a plurality of time slots. The device includes a processor configured to schedule at least one data packet for transmission in at least one data channel time slot that is concurrent to at least one predetermined control channel time slot configured to transmit control information, and a transmission module configured to transmit the at least one data packet in the at least one data channel time slot that is concurrent to at least one predetermined control channel transmission time slot configured to transmit control information.

According to an embodiment, a wireless terminal device is provided that is configured to transmit a data channel comprising a plurality of time slots and for conserving transmission energy. The wireless terminal device includes a processor configured to process at least one data packet using a selector, the selector including an input port and an output port, the selector configured to receive data packets through the input port from a machine-readable medium, to split the at least one data packet into two or more sub packets based on an instruction from the processor, and to send, through the output port, the two or more sub packets to at least one of a plurality of queues, the at least one of a plurality of queues configured to store the two or more sub packets. The device also includes a transmission module configured to schedule, on instruction from the processor, the two or more sub packets for transmission in separate time periods, the transmission module further configured to transmit the two or more sub packets in the separate time periods, wherein an energy level needed to transmit the two or more sub packets in the separate time periods is less than an energy level needed to transmit the at least one data packet in one time period before it is split.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF DRAWINGS

The present disclosure, both in terms of organization and manner of operation, may be further understood by reference to the drawings that include FIGS. 1 through 10, taken in connection with the following descriptions.

DETAILED DESCRIPTION

Figure 1:
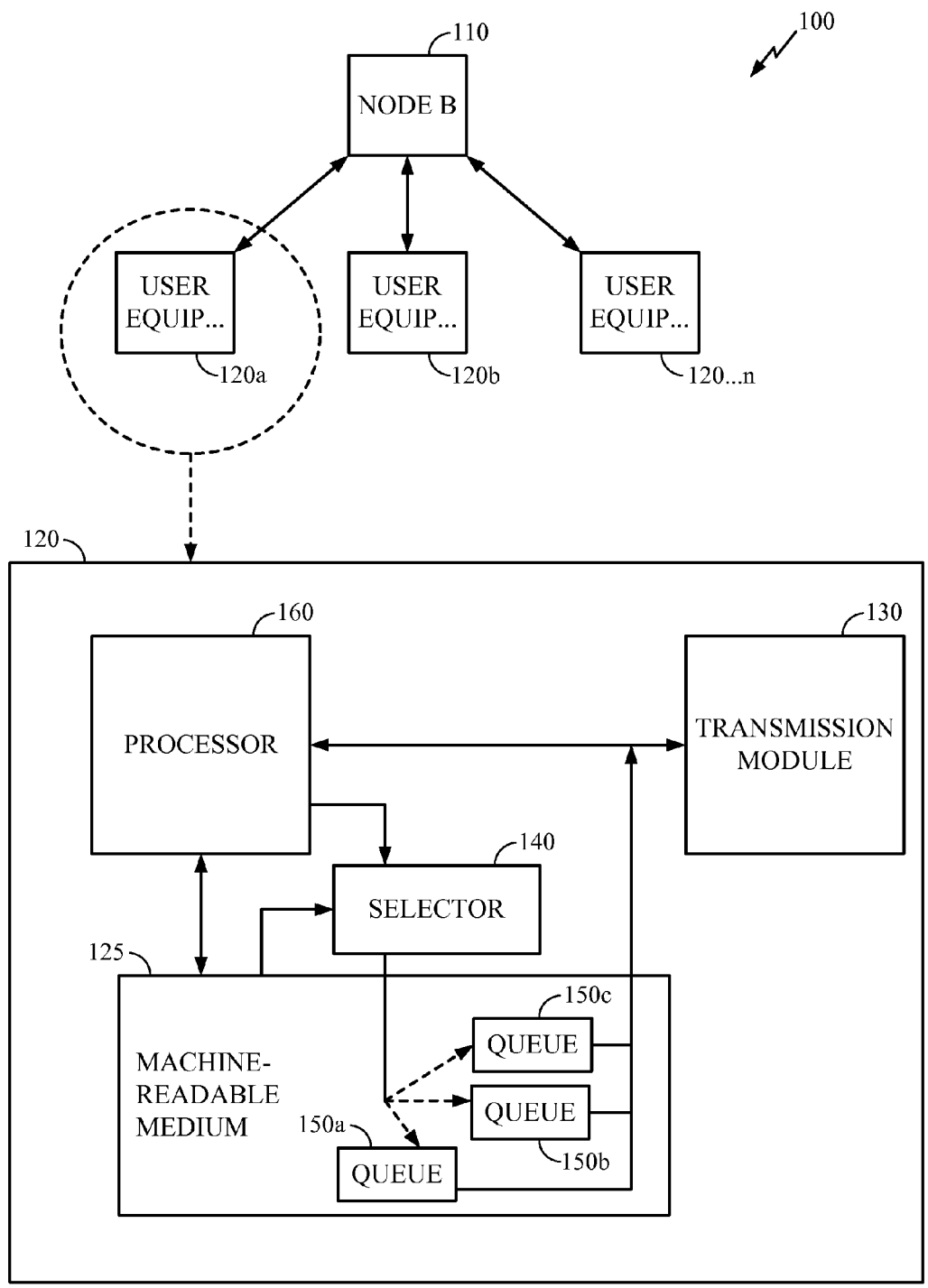
FIG. 1 is block diagram of a wireless communication cell in accordance with an exemplary embodiment.

The following description of illustrative non-limiting embodiments discloses specific configurations and components. However, the embodiments are merely examples, and thus, the specific features described below are merely used to describe such embodiments to provide an overall understanding. One skilled in the art will readily recognize that the present embodiments are not limited to the specific descriptions described below. Furthermore, certain descriptions of various configurations and components that are known to one skilled in the art are omitted for the sake of clarity and brevity. Further, while the term "embodiment" may be used to describe certain aspects, the term "embodiment" should not be construed to mean that those aspects discussed apply merely to that embodiment, but that all aspects or some aspects of the disclosure may apply to all embodiments, or some embodiments.

As used herein, the terms 'mobile terminal' and 'base station' are not exclusive. For instance, a system implementing a 3rd Generation Partnership Project (3GPP) standard may describe what previously might have been referred to as a 'Base Station' as a 'Node B.' Further, a 3GPP system may describe what previously was referred to as a 'Mobile Station' or a 'User Terminal' as 'User Equipment.'

The subject technology of the instant disclosure is described in some embodiments as employed under the 3GPP standards. It is to be understood that such a description of the subject technology is made by way of example, and that various wireless communications standards could be employed to practice the technology disclosed herein in addition to the 3GPP standards, to include any data packet transmission system.

In a certain embodiment, the present disclosure utilizes a method for transmission and reception of both voice and data communications over a wireless link. Communications between users are conducted through one or more nodes or base stations. In some wireless communication systems (such as a system employing the 3GPP standards), an uplink refers to the channel through which signals travel from individual pieces of user equipment (or subscriber stations) to a node (or base station). A downlink may refer to the channel through which signals travel from a node to an individual piece of user equipment.

Data transmitted in an uplink to a node allows for that node to then transfer that data or communication to another piece of user equipment or to other locations, such as to a database or to a computer connected to the wireless system with a landline. Separate pieces of user equipment may be served by a single node or by multiple nodes. Multiple nodes may transmit data between themselves and then on to respective pieces of user equipment. Data, whether transferred during a downlink or an uplink, is usually transferred in 'packets,' or an accumulation of bits of information and/or an accumulation of data symbols comprised of individual bits. Data may be any type of information, and is typically stored digitally as bits comprising ones and zeros. Individual bits may be put together to form a bit word, and a plurality of bit words may be placed together to form a symbol, or a collection of information. As used herein, 'data,' 'information,' 'bit(s),' 'bit word(s),' 'word(s),' 'symbol(s),' 'packet(s),' 'data transmission,' and 'data packet(s)' are meant to be synonymous in that they are all quantifying parameters used to describe a quantity of information or data to be transmitted or transferred.

FIG. 1 is a block diagram of a wireless communication system 100, for example, one using a data packet transmission method for communication. As shown in the figure, Node B 110 is in communicative contact with individual pieces of user equipment 120a, 120b, to 120n. Node B 110 may be connected to other nodes (not shown) within a broader network to provide coverage over a large geographic area. The node or nodes may be connected to other networks, such as the Internet or to a landline telephone network such as a Public Switched Telephone Network (PSTN) that uses E.163/E.164 addresses (or telephone numbers) for addressing, or to a Universal Terrestrial Radio Access Network (UTRAN).

User equipment 120a through 120n may be any number of devices, both in terms of type and quantity. For example, the user equipment 120 may comprise any number of devices, and may be of different types to include converged devices, smart phones, cell phones, wireless computers, personal digital assistants (PDAs), enterprise digital assistants (EDAs), or other type of individual user equipment. Node B 110 may communicate with individual pieces of user equipment 120 within multiple frequency ranges and on multiple channels.

FIG. 1 also illustrates example components for an individual piece of user equipment 120 for use in a wireless communication system in accordance with one aspect of the subject technology. While user equipment 120 may employ the technology of the present disclosure in any data packet transfer communication system, an exemplary embodiment of the subject technology comprising user equipment 120 is described herein with respect to a wireless system implementing a 3GPP communication specification.

As shown in FIG. 1, the user equipment 120 includes a processor 160, machine-readable media 125, a transmission module 130, a selector 140, and data queues 150a, 150b, and 150c. In an embodiment of the subject technology, processor 160 controls the flow of data that has been uploaded to the user equipment 120, e.g., through a USB port, and/or controls the flow of data that has been stored in machine-readable medium 125.

The following discussion of the subject technology describes embodiments that may advance and/or delay and/or combine at least one data packet within a plurality of data channel time slots that are concurrent to a plurality of predetermined control channel time slots configured to transmit control information. An additional embodiment describes splitting a data packet among multiple data channel time slots. Implementation of any these embodiments provides a potential transmission power savings as described herein.

In an embodiment of the subject technology, the user equipment 120 is provided with a dedicated data channel and at least one control channel (hereinafter: 'at least one control channel,' or, simply 'control channel') for transmitting data from user equipment 120 to the Node B 110. The control channel transmits procedural information relating to the data channel, such as transmission power levels and whether the user equipment 120 could use greater bandwidth or not from Node B 110. Notably, the control channel, as implemented under the 3GPP wireless communications standards, comprises both predetermined transmission periods and predetermined non-transmission periods.

Processor 160 controls machine-readable medium 125, selector 140, and transmission module 130 in view of the control channel's predetermined transmission and non-transmission periods. Data that is intended to be transferred on the dedicated data channel may be uploaded to, and/or stored in, machine-readable medium 125 as bits, words, bit words, symbols, and/or data packets. Processor 160 instructs machine-readable medium 125 to transfer data to be transmitted on the dedicated data channel to selector 140. Selector 140 separates the data, based on an instruction from processor 160, into groups of data packets and/or sub-packets, and these are then transferred to a queue or queues (e.g., queue 150a, 150b, 150c) to await transfer to the transmission module 130 for transmission. Selector 140 may be configured to transfer data between queues 150a, 150b, and/or 150c, and back again, and/or to transfer data to and from the queues to machine-readable media 125.

Based on an instruction from processor 160, selector 140 may advance a data packet from an original transmission schedule serviced by queue 150c to a new transmission schedule serviced by queue 150a. For example, the advanced data packet may be moved by selector 140 from a queue representing an original data channel time slot to a queue representing a new data channel time slot, where the original data channel time slot would have been concurrent to a control channel time slot configured as a non-transmission period, and the new data channel time slot is concurrent to a control channel time slot configured to transmit control information. Additional examples of advancing a data packet are described below in relation to FIGS. 2 and 3.

Selector 140, based on an instruction from processor 160, may delay a data packet from an original transmission schedule serviced by queue 150*a* to a new transmission schedule serviced by queue 150*c*. For example, a delayed data packet may be moved by selector 140 from a queue representing an original data channel time slot to a queue representing a new data channel time slot, where the original data channel time slot would have been concurrent to a control channel time slot configured as a non-transmission period, and the new data channel time slot is concurrent to a control channel time slot configured to transmit control information. Additional examples of delaying a data packet are described below in relation to FIGS. 2 and 3.

Also based on an instruction from processor 160, selector 140 may combine more than one data packet from an original transmission schedule serviced by one or more queues, for example, queues 150*b* and 150*c*, to a new transmission schedule serviced by queue 150*a*. For example, a combined data packet may be moved by selector 140 from a queue (or multiple queues) representing an original data channel time slot(s) to a queue representing a new data channel time slot, where the original data channel time slot(s) would have been concurrent to a control channel time slot configured as a non-transmission period, and the new data channel time slot is concurrent to a control channel time slot configured to transmit control information. Additional examples of combining a data packet are described below in relation to FIGS. 4 and 5.

Certain wireless transmission methods (such as the 3GPP standards) require that the user equipment 120 transmit at a higher power level for larger groups of data symbols than that required for smaller groups of data symbols. In view of this, selector 140, on an instruction from processor 160, may split a data packet from an original transmission schedule serviced by queue 150*a* to a new transmission schedule serviced by multiple queues, e.g., queues 150*b* and 150*c*. For example, instead of selector 140 sending an individual data packet to a queue representing on original data channel time slot, selector 140 may send a first part of the data packet to a first queue representing a first data channel time slot and may also send a second or subsequent part of the data packet to a second queue and/or additional queues representing at least one other data channel time slot.

Notably, in various embodiments implementing the subject technology where data packets are split into first and subsequent portions, the first portion and the remaining portion may be equal, but do not need to be. Further, the first portion and any remaining portion(s) may be split into more than two groups. The only requirement for embodiments where data packets are split is that the portions be less than a threshold amount imposed by the wireless communication standard requiring larger transmission power amplitude than that for smaller data symbol groups. Additional examples of embodiments involving the splitting of a data packet are described below in relation to FIG. 6.

While FIG. 1 depicts a single selector 140 and three queues (150*a*, 150*b*, 150*c*) it is to be understood that any number of selectors and/or queues or other hardware implementations could be used, based on the precise wireless transmission device and the precise method to be implemented, as one of skill in the art comprehends.

Further to user equipment 120 shown in FIG. 1, processor 160 instructs transmission module 130 as to when to transmit the groups of data and/or data packets stored in at least one of queues 150*a*, 150*b*, and/or 150*c*. In an embodiment of the subject technology, processor 160 determines when the predetermined control channel will be transmitting in view of the predetermined control channel transmission periods. When data is stored in one of queues 150*a*, 150*b*, and/or 150*c*, and during at least one predetermined control channel transmission period, processor 160 instructs transmission module 130 to transmit, on the dedicated data channel, at least one group of data packets (and/or sub-packets) stored in one of queues 150*a*, 150*b*, and/or 150*c*. The data in that group is then converted to a radio frequency signal and transmitted using an antenna (not shown) to Node B 110 during a predetermined control channel transmission period on the dedicated data channel.

In exemplary embodiments, during predetermined control channel non-transmission periods, processor 160 instructs transmission module 130 to cease the transmission of any of the group(s) of data packets (or sub-packets) that may be stored in at least one of queues 150*a*, 150*b*, and/or 150*c*. At the end of the predetermined control channel non-transmission period, processor 160 evaluates whether there is data in any of queues 150*a*, 150*b*, and/or 150*c*. If data remains in any of the queues 150*a*, 150*b*, and/or 150*c*, then processor 160 may instruct transmission module 130 to transmit at least one group of data packets (and/or sub-packets) stored in one of queues 150*a*, 150*b*, and/or 150*c* on the dedicated data channel during a predetermined control channel transmission period. The group of data packets (and/or sub-packets) and the control information are converted to a radio frequency signal and transmitted using an antenna (not shown) to Node B 110 during a predetermined control channel transmission period.

The process of transmitting data on the data channel during the predetermined control channel transmission periods is carried out until all of the groups of data packets in queues 150*a*, 150*b*, and/or 150*c* have been transmitted and/or until the processor 160 instructs the transmission module 130 to cease transmission. Implementation of the subject technology allows for the user equipment 120 to 'rest' during the predetermined control channel non-transmission periods, thereby saving power and system resources. Notably, not only does implementation of the subject technology save resources for the user equipment 120, but it also saves resources for Node B 110 as other user equipment may transmit data during periods when coexisting user equipment units are resting (or not transmitting) as implemented by the subject technology.

In certain embodiments of the subject technology, quantities of data to be transmitted might exceed available data channel time slots that are concurrent to control channel time slots configured to transmit control information. In these instances, an exemplary embodiment of the subject technology makes best efforts to transmit required data packets within data channel time slots concurrent to control channel time slots configured to transmit control information, but once all of those time slots are utilized, data packets may be transmitted during periods where control channel information is not being transmitted, in an effort to avoid and/or reduce latency of transmitted data.

The transmission module 130 may comprise a modulator that receives, through selector 140, digitized data from the processor 160 or from other locations within user equipment 120, such as an embodiment where the machine-readable media 125 comprises a memory or a hard disk. The transmission module 130 may include any number of queues, multiplexers, coders, selectors, and memory banks as would be known to one of skill in the art and dependent upon the precise type of transmission scheme utilized. For example, in a CDMA system, the transmission module 130 may include both an encoder (for instance, a Walsh encoder) for encoding transmissions, and a correlator that correlates the transmissions from the user equipment 120 to the codes implemented by the encoder. Such a setup allows for simultaneous transmissions from multiple pieces of user equipment over the same or similar frequencies within the same area covered by an individual node for direct sequence spread spectrum transmission, such as may be implemented using elements 120a through 120n and Node B 110 in FIG. 1, and as would be understood by those skilled in the art.

Processor 160 may comprise a transistorized microchip, a discrete transistorized processor, a programmable logic controller, a central processing unit (CPU), a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information, and may be a microprocessor that includes a CPU among other functional micro-circuitry, such as is typical in Very Large Scale- or Ultra-Large Scale Integration microchips created using standard microprocessor manufacturing techniques.

Processor 160 may be configured to monitor and run multiple processes within the user equipment 120, and may be configured to execute instructions stored in one or more machine-readable media 125. Machine-readable media 125 (to include queues 150a, 150b, and/or 150c) may be either non-volatile storage (e.g., read-only memory, flash memory, magnetic media, optical media, etc.) or volatile storage (e.g., random-access memory). Machine-readable media 125 may be used for storing software to include instructions, for example, processor-executable code. For instance, the processor 160 may read an instruction stored within the machine-readable media 125, and then may execute that instruction, which may include sending data packets to the transmission module 130 for transmission in the radio frequency domain.

As used herein, "software" shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code). Machine-readable media 125 may include storage integrated into processor 160, such as might be the case with an ASIC. Machine-readable media 125 may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media 125 may include a transmission line or a carrier wave that encodes a data signal. Those skilled in the art will recognize how best to implement the described functionality for the user equipment 120 for the instructions to be realized.

The following discussion of implementation of the subject technology references the disclosure in relation to release number 7 of the 3GPP standards (including specifications 25.211 (version 7.6.0); 25.212 (version 7.8.0); 25.213 (version 7.5.0); and 25.214 (version 7.9.0)), and specifically an aspect of the stated standards including dedicated data transmission channels known as Enhanced Dedicated Channels (E-DCH). Various embodiments of the subject technology may be implemented on any data packet transfer communication system comprising an uplink data packet channel transmission that is similar to an E-DCH.

In a system implementing an uplink data packet channel transmission, Node B coordinates all of the data transmitted by all of the user equipment within its coverage area in a request-grant fashion. That is, each individual piece of user equipment 120 in the coverage area of Node B 110 requests permission to send data, and Node B 110 decides when and how many individual pieces of user equipment will be allowed to do so. In certain embodiments, user equipment 120 receives instructions from Node B 110 on how large the bandwidth of transmitted data may be, and what power to transmit the data at, among other criteria. FIGS. 2, 3, 4, and 5 each illustrate an uplink data packet channel transmission for user equipment 120 comprising at least one control channel and one data channel, where each of the control channel(s) and the data channel includes 60 time slots. One of skill in the art readily recognizes that the time slots depicted are merely exemplary, and that any number of time slots could be implemented to practice the subject technology.

Figure 2:
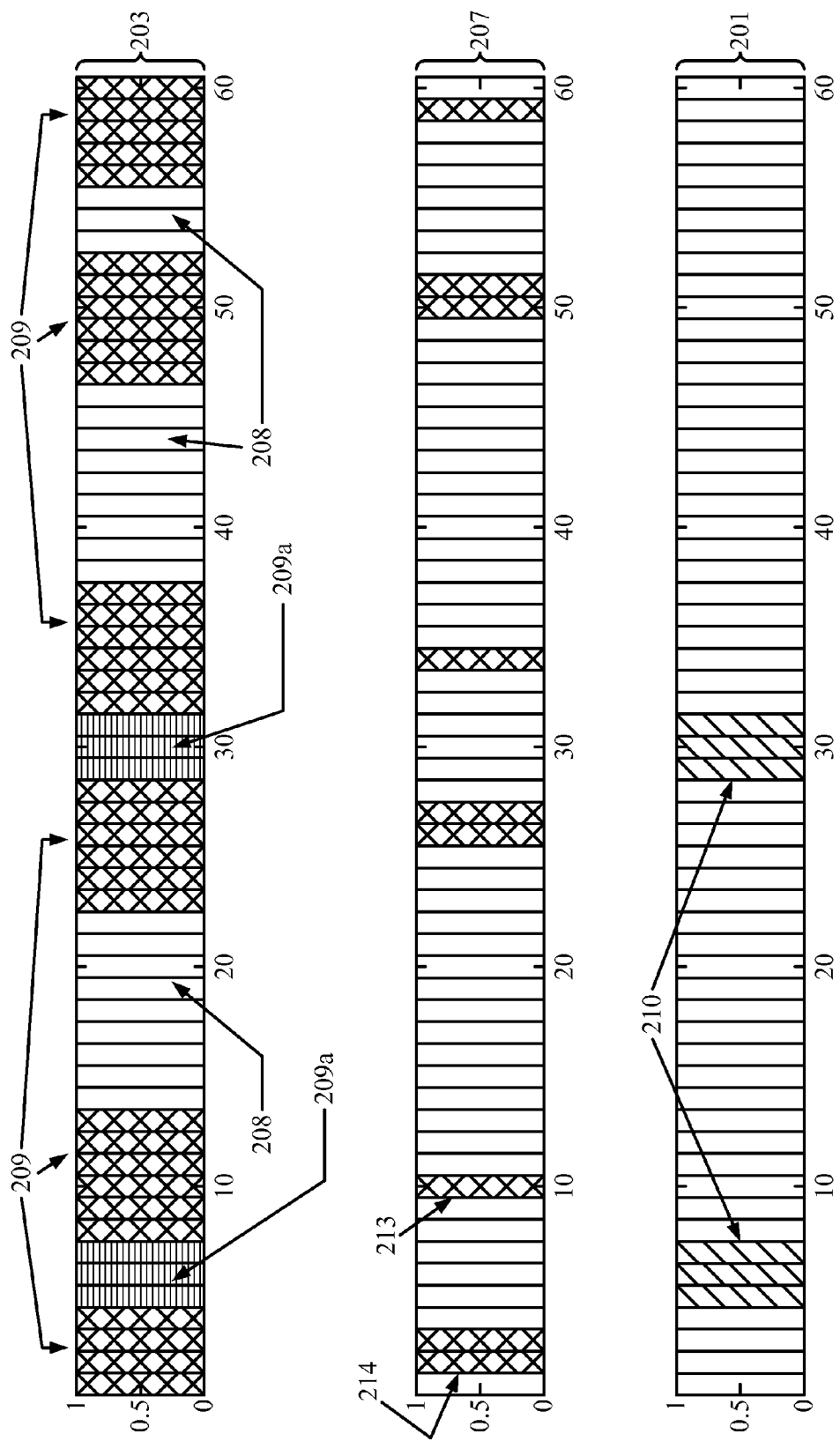
FIG. 2 illustrates an exemplary uplink data packet channel transmission prior to application of the subject technology.

FIG. 2 illustrates an exemplary uplink data packet transmission prior to application of the subject technology. While, for purposes of brevity and clarity, an uplink is described herein as an example of the subject technology, one of skill in the art would comprehend that the subject technology also applies to downlinks. As shown in FIG. 2, the uplink data packet transmission includes at least two channels, an uplink data packet channel 201 for data transfer between an individual piece of user equipment and a node (for example, between user equipment 120 and Node B in FIG. 1) and an uplink control channel 203 for controlling and coordinating overall communication (again, for example, between user equipment 120 and Node B as shown in FIG. 1).

Also shown in FIG. 2 is channel 207, a channel that is similar to what is known under the 3GPP standards as a High Speed Dedicated Physical Control Channel (HS-DPCCH). Channel 207 is not crucial for an understanding of the functionality of the subject technology beyond the fact that the channel is an additional control channel that transmits control information 213 and 214, and that embodiments of the subject technology could be implemented using either or both of control channels 203 and/or 207. In certain embodiments, the subject technology described herein may be applied to channel 207 and not to channel 201, or vice-versa. In certain embodiments, the subject technology described herein may be applied to both channels 207 and 201.

Uplink control channel 203, in certain embodiments, may be described as essentially a 'pilot' channel for channel estimation. Uplink control channel 203 may include information on timing and power. Power information may include the strength or amplitude at which the user equipment 120 transmits within the coverage area of Node B 110 (as allowed by Node B 110).

As shown in FIG. 2, uplink control channel 203 includes time slots beginning at zero and ending at sixty. During the time slots shown, uplink control channel 203 transmits in multiple periods. One of skill in the art readily comprehends that the periods shown are merely illustrative for the time period covering the 60 time slots represented in FIG. 2. The periods of transmission comprise predetermined transmission periods 209 for transmission of pilot information (i.e., information on timing and power, among other potential control information). Also shown as part of uplink control channel 203 are designated non-transmission periods 208 comprising a plurality of periods in the sixty-slot period where uplink control channel 203 is configured to not be transmitting control information. In certain embodiments (for instance, embodiments implementing the 3GPP standards), the uplink control channel 203 also includes transmission periods 209a for pilot information that is transmitted when the uplink data channel 201 transmits data, for instance, as shown happening in time slots 5-7 and 29-31. In certain embodiments (for instance, when another standard besides the 3GPP standard is being implemented), the transmission periods 209a are actually designated non-transmission periods 208 where transmissions are not made by the uplink control channel 203.

In the embodiment of the subject technology similar to the 3GPP standards, uplink control channel 203 may include a slot comprising 2560 'chips,' symbols, or bit words. An individual slot may comprise a pilot symbol, a transport formation combination indicator (TFCI), and/or a transmit power control (TPC) symbol. The TFCI indicates to Node B (for instance, element 110 in FIG. 1) the type and quantity of the data to be transmitted, and the TPC indicates to Node B 110 at what power level the user equipment intends to transmit at, within the maximum and minimum allowed (the parameters are provided from the Node B 110, and the user equipment 120 is configured to operate within those parameters). The TPC may also include information on previously received signal-to-interference ratios, and may provide that information to Node B. Channel 203 may also specifically include information on any transmission power gain factors that the user equipment is applying to transmitted data, based on the type of data, the size of the data, and received channel quality indicators.

Uplink data packet channel 201 may transmit data packets comprising any type of data. As shown in FIG. 2, the uplink data packet channel 201 transmits twice within the 60 slot time period shown by uplink data packet transmission periods 210, which comprise slots 5-7 and 29-31. Because FIG. 2 illustrates a schedule of data packet transmission prior to application of the subject technology, the two transmission periods 210 shown in FIG. 2 have been scheduled for transmission in uplink data packet channel time slots that are concurrent to control channel time slots configured for time slots 5-7 and 29-31 (in certain embodiments time slots of 5-7 and 29-31 on control channel 203 may be either non-transmission periods 208 or transmission periods 209a, as described above). As such, the data in time slots 210 have not been advanced and/or delayed and/or combined so as to coincide with control channel transmission periods reflected by periods 209 on data control channel 303. In certain embodiments, transmission periods 213 and 214 on channel 207 have been purposefully placed through application of the subject technology so that they are transmitted at the same time as the predetermined transmission periods 209 on control channel 203. For instance, control information 214 has been placed through application of the subject technology in time slots 2 and 3 to mirror the first instance in which the predetermined control channel 209 transmits control channel information.

Figure 3:
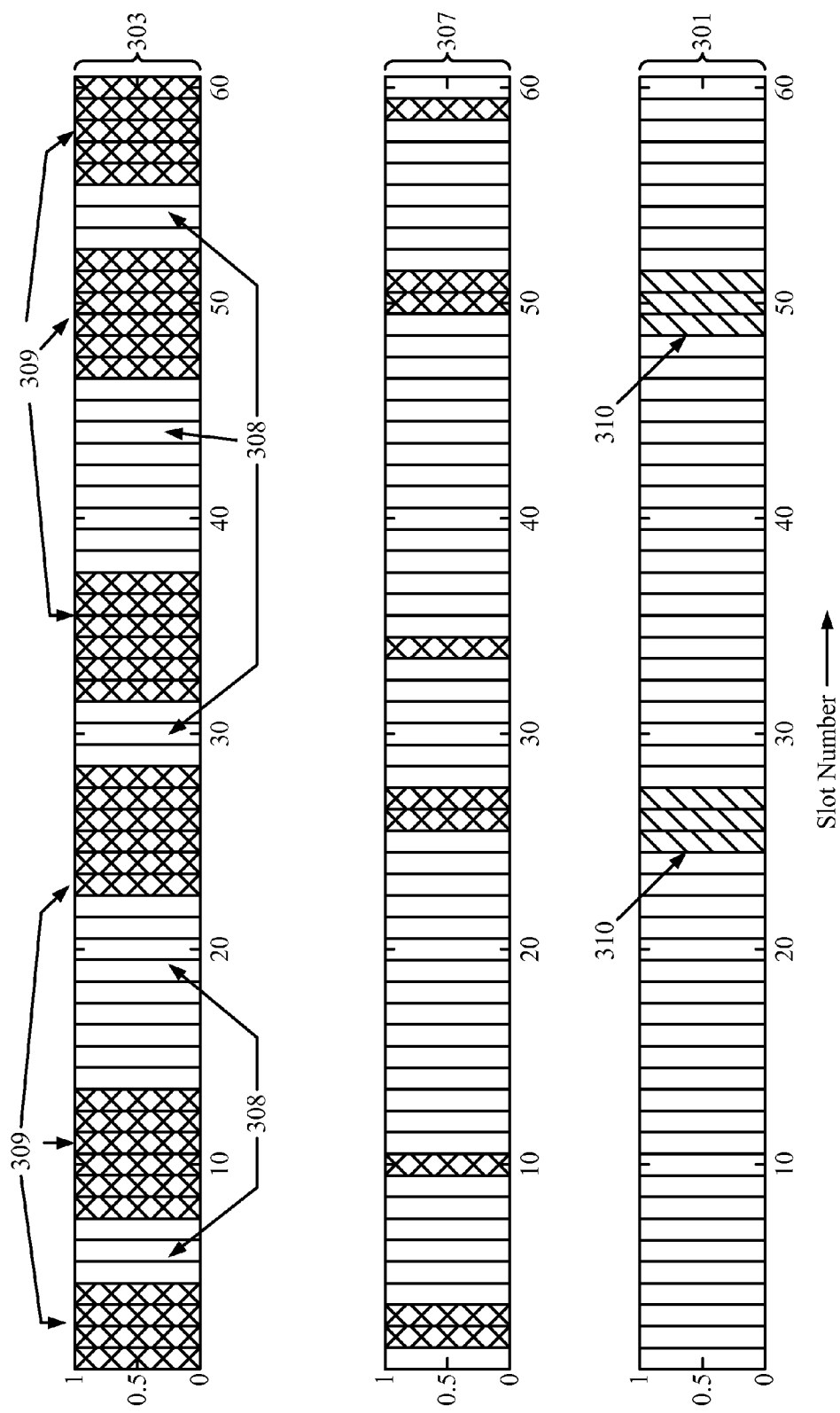
FIG. 3 illustrates an exemplary embodiment where data packets have been delayed and/or advanced to transmit in time slots that coincide with control channel transmission time slots.

FIG. 3 illustrates an embodiment of the disclosure including uplink data packet channel 301 and uplink control channel 303. As shown in the figure, uplink control channel 303 includes both predetermined transmission periods 309 and predetermined non-transmission periods 308. Uplink data packet channel 301 includes two transmission periods 310 that have been delayed and/or advanced from original time slots that may have been concurrent to predetermined non-transmission control channel periods 308 (for instance, as shown in FIG. 2 where the two transmission periods 210 coincide with predetermined non-transmission control channel periods 208 or 209a, depending upon embodiments implemented). To provide the user equipment device 120 the chance to not be transmitting during control channel non-transmission periods 308, the data packets on uplink data packet channel 301 have been delayed and/or advanced (for instance, as described in relation to FIG. 1) to time slots that are concurrent to predetermined control channel transmission periods 309 (specifically, time slots 25-27 and 49-51), allowing the user equipment 120 to be transmitting only during the predetermined control channel transmission periods 309, thereby saving power and resources. Also, all of the control channel transmissions on channel 307 have been aligned by implementation of the subject technology so that they are transmitting only during the predetermined transmission periods 309, thereby saving power and resources.

The subject technology coordinates transmission of data packets on uplink data packet channel 301 during the periods where uplink control channel 303 is transmitting control information during predetermined periods 309. Notably, uplink control channel 303 also includes predetermined non-transmission periods 308. The implementation of the subject technology allows for the user equipment 120 to 'rest' during the predetermined non-transmission periods 308, thereby saving power and system resources. Not only does implementation of the subject technology save resources for the user equipment 120, but it also saves resources for Node B 110 as other user equipment may transmit data during periods when coexisting user equipment units 120 are resting (or not transmitting) as implemented by the subject technology.

In various embodiments of the subject technology, during periods 308 user equipment 120 may stop transmitting partially or entirely. As such, data transmission from the user equipment 120 is optimally scheduled based on uplink control channel 303 'wake' times, or time periods 309 when uplink control channel 303 is transmitting during predetermined periods 309. The scheduling based on the subject technology minimizes power consumption, thereby saving valuable battery life.

In practice, consider that an initial attempt by a user to upload data would otherwise indiscriminately fall anywhere in slots 1 through 60, and that by coincidence the user selects a time slot that coincides with a predetermined non-transmission period 308 for uplink control channel 303 comprising time slots 5 through 7. Exemplary embodiments of the subject technology may either delay the transmission of the data until at least time slot 8-10, or advance the transmission of the data to at least time slots 2-4, as those time slots coincide with a predetermined control channel transmission period 309 comprising at least three time slots in length. Delaying and/or advancing may be performed as discussed in relation to FIG. 1, or using another procedure as one of skill in the art would comprehend. If more time slots are required, the device of the instant disclosure may include as many time slots as possible on the data channel that coincided with uplink control channel transmission time slots 309 as are necessary.

Although channel 303 is described herein in relation to periods that are predetermined by a wireless transmission protocol for both transmission and non-transmission, it is to be understood that other definitions of predetermined are foreseen as within the scope of the subject technology. For instance, in addition to transmission periods that are predetermined by a wireless protocol, predetermined transmission periods are also seen as being user-selectable, as being determined from a look-up table, a state machine, as being determined from an algorithm, as being determined by virtue of a calculation performed by a processor, as being based on channel quality and/or signal-to-noise thresholds or signal-to-interference thresholds, among any other manner, fashion, or protocol that would lend meaning to the term 'predetermined.'

Figure 4:
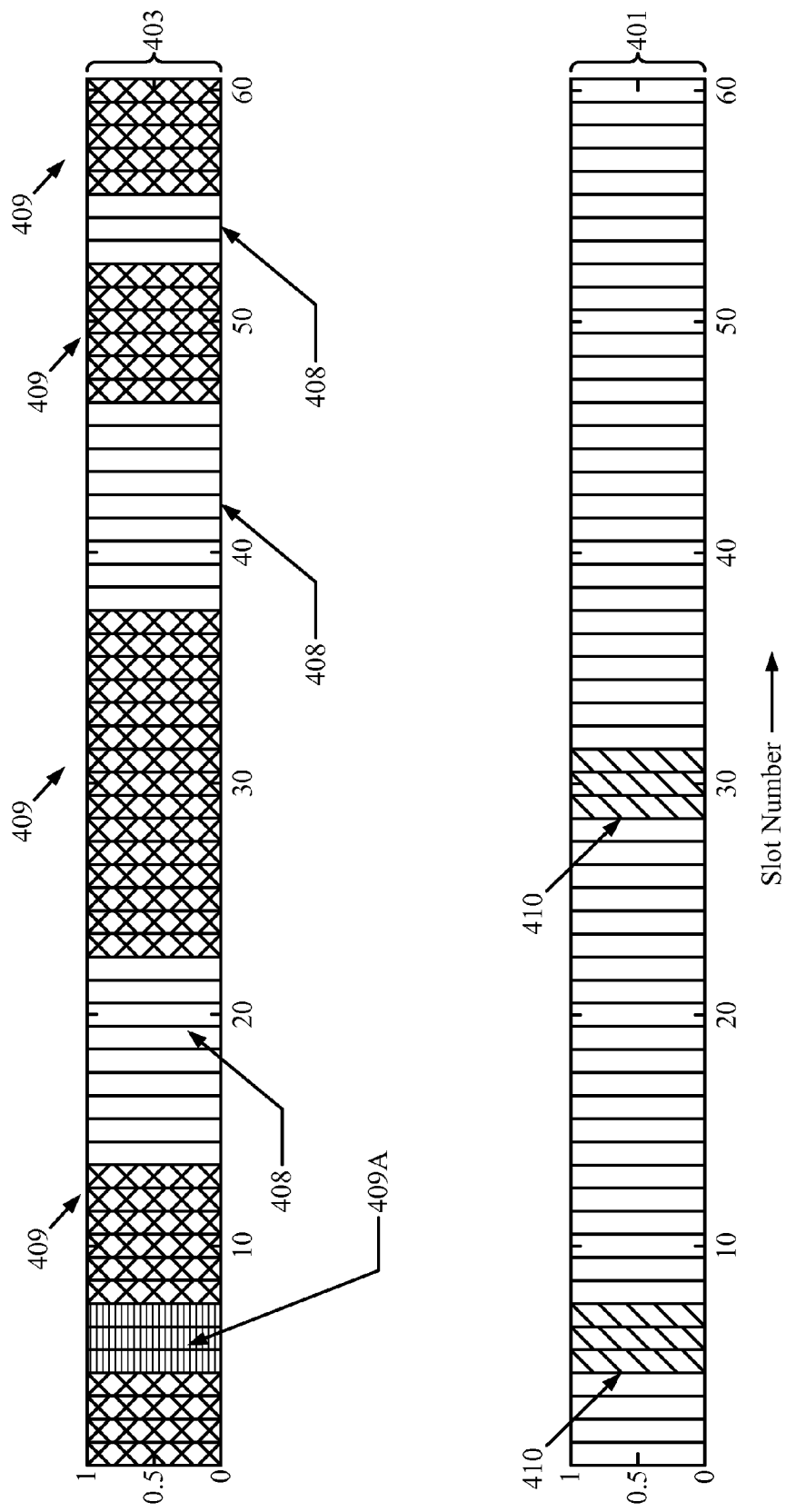
FIG. 4 illustrates an exemplary uplink data packet channel transmission prior to application of the subject technology.

FIG. 4 illustrates an exemplary uplink data packet channel transmission prior to application of the subject technology. As shown in FIG. 4, an uplink data channel transmission comprises both uplink data packet channel 401 and uplink control channel 403. Uplink control channel 403 comprises both predetermined transmission periods 409 and predetermined non-transmission periods 408. Because FIG. 4 illustrates a schedule of data packet transmission prior to application of the subject technology, the two transmission periods 410 shown in FIG. 4 have been scheduled for transmission in uplink data packet channel time slots that are concurrent to control channel time slots 5-7 and 29-31. In certain embodiments (for instance, embodiments implementing the 3GPP standards), the uplink control channel 403 includes transmission periods 409a for pilot information that is transmitted when the uplink data channel 401 transmits data, for instance, as shown happening in time slots 5-7 and 29-31. In certain embodiments (for instance, when another standard besides the 3GPP standard is being implemented), the transmission periods 409a are actually designated non-transmission periods 408 where transmissions are not made by the uplink control channel 403. Notably, the data in time slots 410 has not been advanced and/or delayed and/or combined so as to coincide with control channel transmission periods reflected by periods 409 on data control channel 403.

Figure 5:
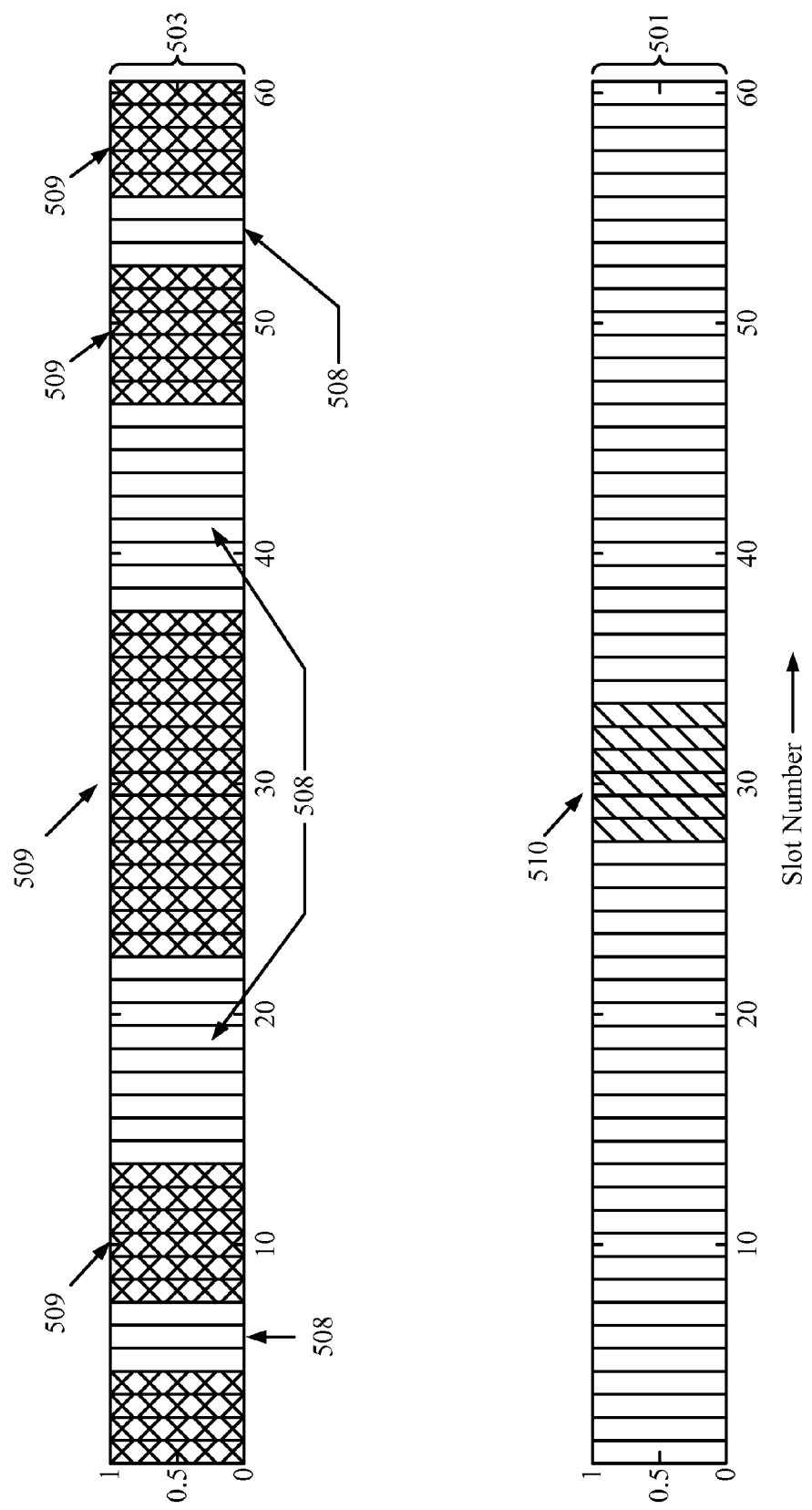
FIG. 5 illustrates an exemplary embodiment where data packets have been combined to transmit in time slots that coincide with control channel transmission time slots.

FIG. 5 illustrates embodiments of the subject technology that include data channel 501 and control channel 503. As shown in the figure, uplink control channel 503 includes both predetermined transmission periods 509 and predetermined non-transmission periods 508. Uplink data packet channel 501 includes transmission period 510 (spanning time slots 28-33) that have been combined from multiple packets of data separated by at least one time slot to time slots that coincide with predetermined uplink control channel transmission time slots 509. For instance, in comparison to FIG. 4, the data packets in transmission period 510 have been combined from an original schedule whereby the data packets where scheduled for transmission in time slots 5-7 and 29-31. Combining the packets may be accomplished as discussed in relation to FIG. 1, or using another procedure as one of skill in the art would comprehend. The user equipment device therefore is not transmitting during uplink control channel 503 non-transmission periods 508, saving power and resources.

Although channel 503 is described herein in relation to periods that are predetermined by a wireless transmission protocol for both transmission and non-transmission, it is to be understood that other definitions of predetermined are foreseen as within the scope of the subject technology. For instance, in addition to transmission periods that are predetermined by a wireless protocol, predetermined transmission periods are also seen as being user-selectable, as being determined from a look-up table, a state machine, as being determined from an algorithm, as being determined by virtue of a calculation performed by a processor, as being based on channel quality and/or signal-to-noise thresholds or signal-to-interference thresholds, among any other manner, fashion, or protocol that would lend meaning to the term 'predetermined.'

Figure 6:
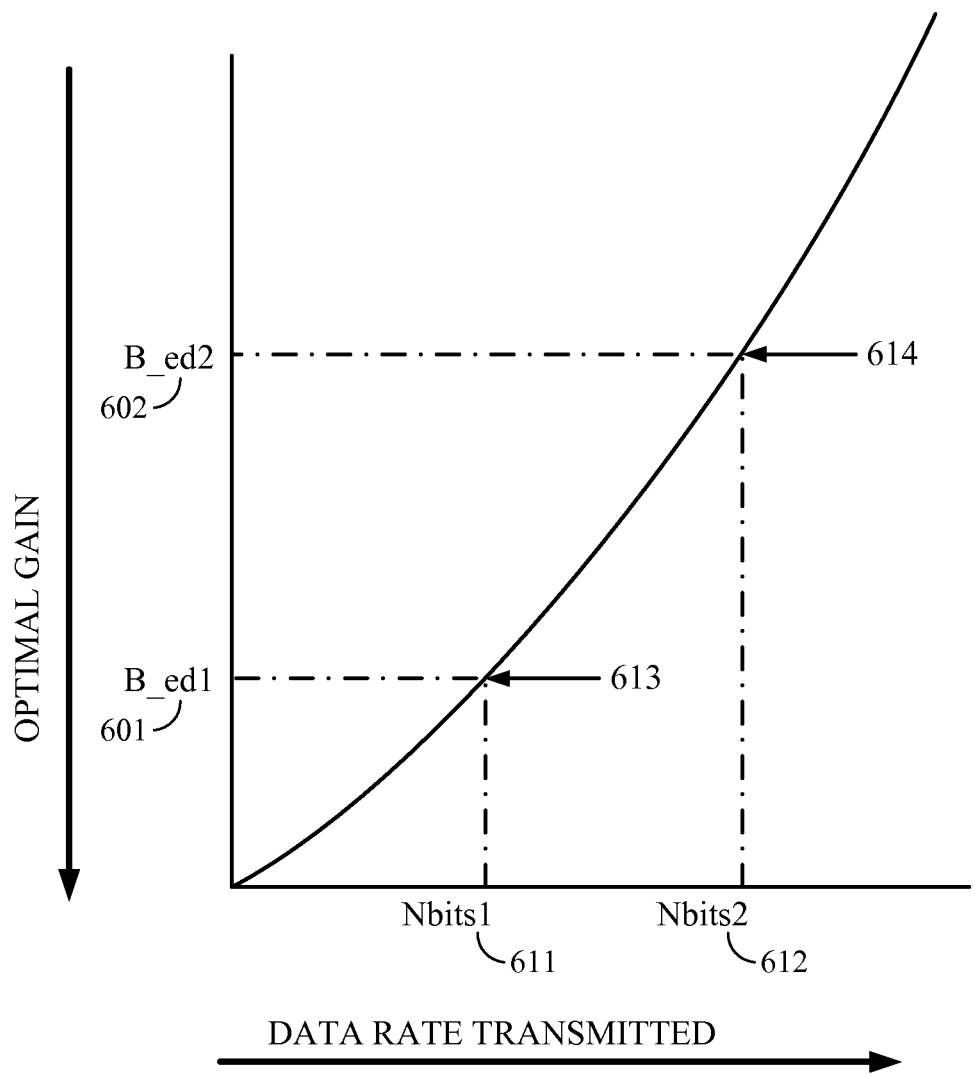
FIG. 6 illustrates an exemplary embodiment where data packets have been split for transmission.

FIG. 6 is a graph depicting gain in comparison to data rate. In terms of the power expenditure of a portable device (e.g., user equipment 120 in FIG. 1), an optimal gain may be expressed as the lowest transmission gain necessary to comply with the employed wireless standard while successfully transmitting the data bits in question. The previous can be related to particular wireless communications standards, for example the 3GPP 25.214 standard, which requires a higher transmission gain rate for larger quantities of data bits within a time period than for certain smaller quantities of data bits within the same time period.

Consider that Nbits1 611 depicts a data rate that is half that of Nbits2 612. As shown in FIG. 6, point 613 reflects a point on the transmission power curve where a gain of B_ed1 601 supports the data rate of Nbits1 611. Because the standard employed by the wireless communication system requires a non-linear increase in transmission power between the data rate reflected by Nbits1 611 and Nbits2 612, point 614 reflects a required transmission power that is more than twice that of point 613, even though the data rate of Nbits2 612 is merely twice the data rate of Nbits1 611. In other words, despite a proportional input of bits between Nbits1 611 and Nbits2 612, the transmission power output required to transmit the bits is greater for Nbits2 612 on a per-bit basis. The explicit relationship between optimal gain and user equipment power expenditures is that at a lower data rate, user equipment transmitting at a lower data rate (e.g., user equipment 120 as shown in FIG. 1) will need less of a transmission amplitude gain than when the same user equipment is transmitting at certain higher data rates.

The 3GPP standard requires this type of arrangement where Node B 110 will require a particular transmission power from user equipment 120 based on the size of data to be transmitted. The standard requires that larger quantities of data be transmitted with higher transmission amplitude than smaller quantities of data. An embodiment of the present disclosure addresses this issue by splitting data packets into sub packets so that they do not trigger the requirement to be transmitted at a higher power level. A sub packet is described herein as being any portion of a packet of data that is smaller than a regular sized packet. For instance, a sub packet may be comprise a bit or bits, a symbol and/or group of symbols, various parts of a data packet, and/or various portions of a data packet. Referring back to FIG. 6, the curve created from the gain compared to the data rate shows that the power used to support the data rate may be optimized by splitting data packets into sub packets that are then transmitted over multiple periods.

For example, consider a single data packet comprising 10,000 bits. Under the 3GPP standards, the gain required to transmit this large block may be 168 units of power. By dividing the single large data packet into two sub packets of, say, 4,000 and 6,000 bits, and then transmitting the sub packets at separate times, the same amount of total data is transmitted, but at less than 168 total units of power because the user equipment 120 is never required by Node B to transmit at the higher power level required of the single 10,000 bit data packet.

Splitting data packets may be accomplished as discussed in relation to FIG. 1, or using another procedure as one of skill in the art would comprehend. For example, a selector (e.g., selector 140 in FIG. 1), on an instruction from a processor (e.g., processor 160 in FIG. 1), may split a data packet from an original transmission schedule serviced by a queue (e.g., queue 150*a* in FIG. 1) to a new transmission schedule serviced by multiple queues (e.g., queues 150*b* and 150*c* in FIG. 1). That is, instead of selector 140 sending an individual data packet to a queue representing on original data channel time slot, selector 140 may send a first sub packet to a first queue representing a first data channel time slot and may also send a second or subsequent sub packet to a second queue and/or additional queues representing at least one other data channel time slot. The data of the first sub packet in the first queue is then transmitted in a time period that is different from the time period(s) in which the second or subsequent sub packet(s) are transmitted.

Notably, in various embodiments implementing the subject technology where data packets are split into first and subsequent sub packets, the first sub packet and the remaining sub packet(s) may be equal, but do not need to be. Further, the first sub packet and any remaining sub packet(s) may be split into more than two groups. The only requirement for embodiments where data packets are split is that the sub packets be less than a threshold amount imposed by the wireless communication standard requiring larger transmission power amplitude for large data packets than for smaller sub packet groups.

If the data to be transmitted exceeds the predetermined limit that requires greater transmission power, then assume that X=the power for 1 large data packet. By splitting the packets into 2 packets, the transmission power to transmit both of the smaller packets will be less than X. The smaller packets need not be divided equally, and may comprise more than 2 packets. FIG. 6 shows this relationship by point 614, that is not located linearly along the curve that reflects power output in relation to the data rate. Point 613 reflects a savings in transmission power where, assuming Nbits1 611 is ½ of Nbits2 612. Hence, by splitting data packets into smaller groups to be transmitted at multiple times, the present disclosure provides for a savings in transmission power.

Figure 7:
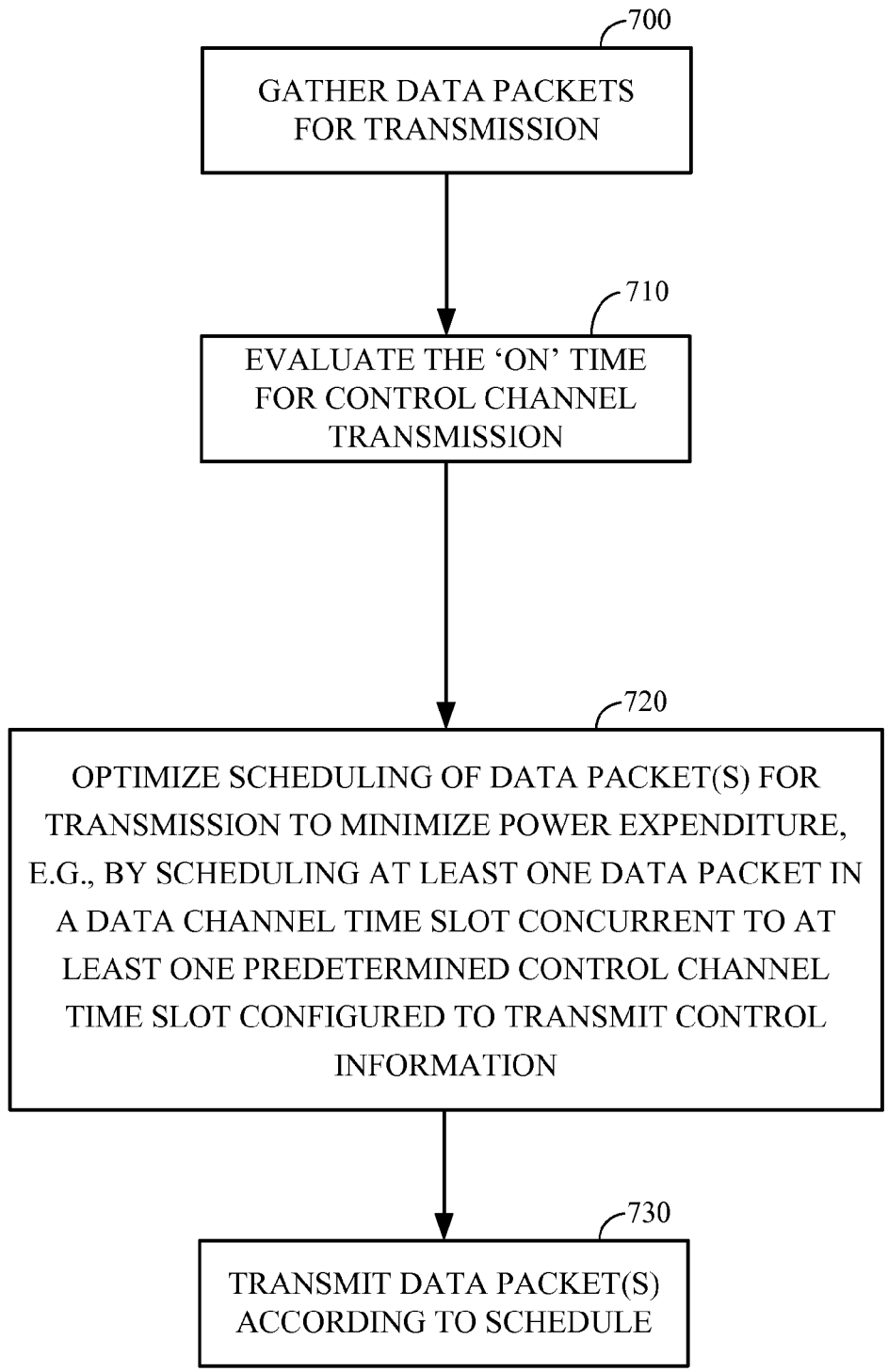
FIG. 7 is a flowchart of instructions and/or method steps in accordance with an exemplary embodiment.

FIG. 7 is a flow chart of a method (or processor executable instructions) for implementing a certain embodiment of the subject technology for optimizing transmissions from a wireless user equipment device, for instance the device illustrated in FIG. 1 as element 120. The user equipment device includes at least an uplink control channel and an uplink data packet channel, but may also include additional channels such as a channel dedicated to voice communications in addition to other channels for additional types of data or information transfer, as is common among PDAs and like devices.

In FIG. 7, at instruction (or method step) 700 a processor (such as processor 160 in FIG. 1) may execute an instruction to gather data packets for transmission. The data packets to be transmitted may be stored for transmission within a memory (e.g., machine-readable media in FIG. 1). The data packets may also or alternatively be segregated within a particular portion of the memory (e.g., a queue) to designate the data as intended for transmission. Once the data is gathered, at instruction (or method step) 710, the processor executes an instruction to evaluate the 'on' time for an uplink control channel transmission.

After determining when the uplink control channel will be transmitting, at instruction (or method step) 720 the processor may optimize the scheduling of data packets for transmission to minimize transmission power expenditure. Optimized scheduling may comprise at least one of, and including combinations of, advancing, delaying, and/or combining a data packet. For example, a data packet may be advanced and/or delayed as discussed in relation to FIGS. 1, 2, and 3 to a data channel time slot that is concurrent to a control channel time slot configured to transmit control information. A data packet may be combined as discussed in relation to FIGS. 1, 4, and 5 to a data channel time slot that is concurrent to a control channel time slot configured to transmit control information. In various embodiments of the subject technology, a data packet might undergo combinations of the previous. For example, data packets might be combined as discussed in relation to FIGS. 1, 4, and 5, and also be advanced and/or delayed as discussed in relation to FIGS. 1, 2, and 3.

At instruction 730 the processor may instruct a transmission module to transmit the scheduled and optimized data packets, thereby allowing the possibility that transmission power and system resources may be conserved. For example, in cases where a data packet has been advanced and/or delayed to an uplink data channel time slot that coincides with an uplink control channel time slot configured to transmit control information, user equipment 120 may be allowed to rest in periods where the uplink control channel is configured for non-transmission periods. That is, because the user equipment 120 is transmitting during the control channel period configured to transmit control information while simultaneously transmitting data packets on the uplink data packet channel, the user equipment 120 may cease transmitting during the period when the uplink control channel is not transmitting. The effect of implementing the subject technology is that transmission power is saved and overall system resources are conserved.

Figure 8:
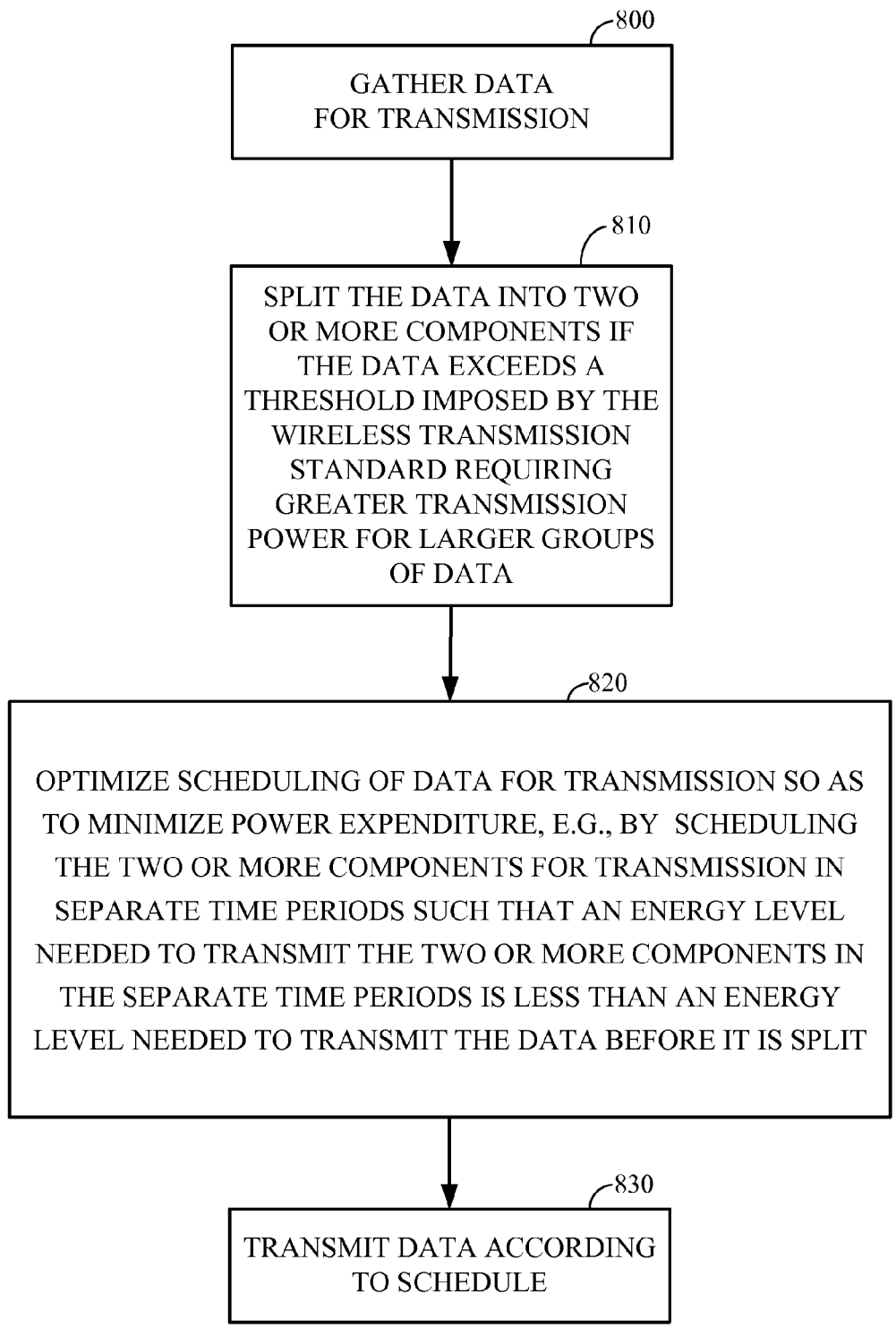
FIG. 8 is a flowchart of instructions and/or method steps in accordance with an exemplary embodiment.

FIG. 8 is a flow chart of a method (or processor executable instructions) for implementing a certain embodiment of the subject technology for optimizing transmissions from a wireless user equipment device, for instance the device illustrated in FIG. 1 as element 120. The user equipment device includes at least an uplink control channel and an uplink data packet channel, but may also include additional channels such as a channel dedicated to voice communications in addition to other channels for additional types of data or information transfer, as is common among PDAs and like devices.

In FIG. 8, at instruction (or method step) 800 a processor (such as processor 160 in FIG. 1) may execute an instruction to gather data for transmission. The data to be transmitted may be stored for transmission within a memory (e.g., machine-readable media in FIG. 1). The data may also or alternatively be segregated within a particular portion of the memory (e.g., a queue) to designate the data as intended for transmission. Once the data is gathered, at instruction (or method step) 810, the processor executes an instruction to split the data into two or more components if the data exceeds a threshold imposed by the wireless transmission standard requiring greater transmission power for larger groups of data. The data may be split into different queues (or portions of memory) as discussed in relation to FIG. 1 and queues 150*a*-150*c*.

After splitting the data, at instruction (or method step) 820 the processor may optimize the scheduling of data packets for transmission to minimize transmission power expenditure by scheduling the two or more components for transmission in separate time periods such that an energy level needed to transmit the two or more components in the separate time periods is less than an energy level needed to transmit the data before it is split. In addition to being split and then scheduled for transmission, a data packet may also be advanced and/or delayed as discussed in relation to FIGS.

1, 2, and 3 (to a data channel time slot that is concurrent to a control channel time slot configured to transmit control information) and then scheduled for transmission. In various embodiments of the subject technology, a data packet might undergo various combinations of the previous. For example, a large data packet might be both split into two components that each individually possess a data quantity that is less than a threshold imposed by a wireless standard requiring a greater amplitude of transmission power for a single, large transmission. Additionally, the first split component may be advanced to an uplink data packet channel time slot that is concurrent to an uplink control channel time slot configured for transmission of control information, and a second split component may be delayed to an uplink data packet channel time slot that is also concurrent to an uplink control channel time slot configured for transmission of control information.

At instruction 830 the processor may instruct a transmission module to transmit the split and otherwise optimized data packets, thereby allowing the possibility that transmission power and system resources may be conserved. The effect of implementing the subject technology is that transmission power is saved and overall system resources are conserved.

The instructions and/or method steps shown in FIGS. 7 and 8 may be implemented by utilizing software, an algorithm, a processor, and/or a computer system in response to an output of a processor executing one or more sequences of one or more instructions contained in a memory. The scheduling instruction may include a sequence of delaying or advancing a data packet, or of combining data packets; or of splitting a data packet. Such instructions, processes, or methods may be read into a memory from machine-readable media, such as a data storage device and/or a lookup table (for example, machine-readable media 125 as shown and discussed in relation to FIG. 1). Such instructions, processes, or methods may also be determined in real time, that is, processed and/or determined in response to temporal events as they occur, or soon after they occur, or they may be predetermined.

Figure 9:
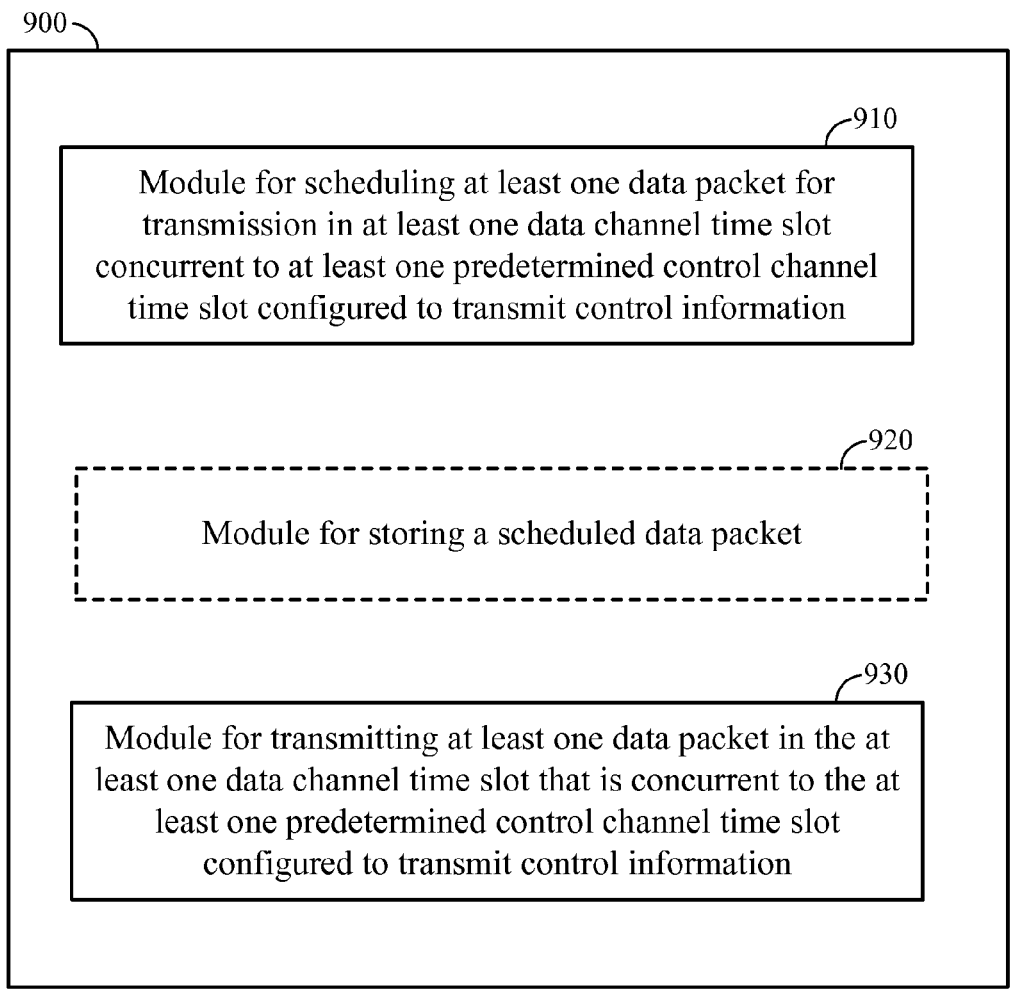
FIG. 9 is a block diagram of an exemplary embodiment including an individual user equipment device with various functional modules.

FIG. 9 is a conceptual block diagram illustrating an example of the functionality of an implementation of the subject matter of the present disclosure. FIG. 9 illustrates a conceptual mobile device 900 that includes a module for scheduling 910, a module for storing 920, and a module for transmitting 930. In various embodiments, mobile device 900 corresponds to the embodiments described above.

Each of the modules 910, 920, and 930 may represent aspects of the above-described embodiments. Module 920 is illustrated with dashed lines, indicating that it is an optional module. Module 910 provides the functionality of scheduling at least one data packet for transmission in at least one data channel time slot concurrent to at least one predetermined control channel time slot configured to transmit control information. Module 920 provides the functionality of storing the at least one data packet scheduled by module 910. Module 930 provides the functionality of transmitting the at least one data packet in the at least one data channel time slot that is concurrent to the at least one predetermined control channel time slot configured to transmit control information. Any or all of modules 910, 920, and/or 930 may be implemented using the techniques in the embodiments described above.

Figure 10:
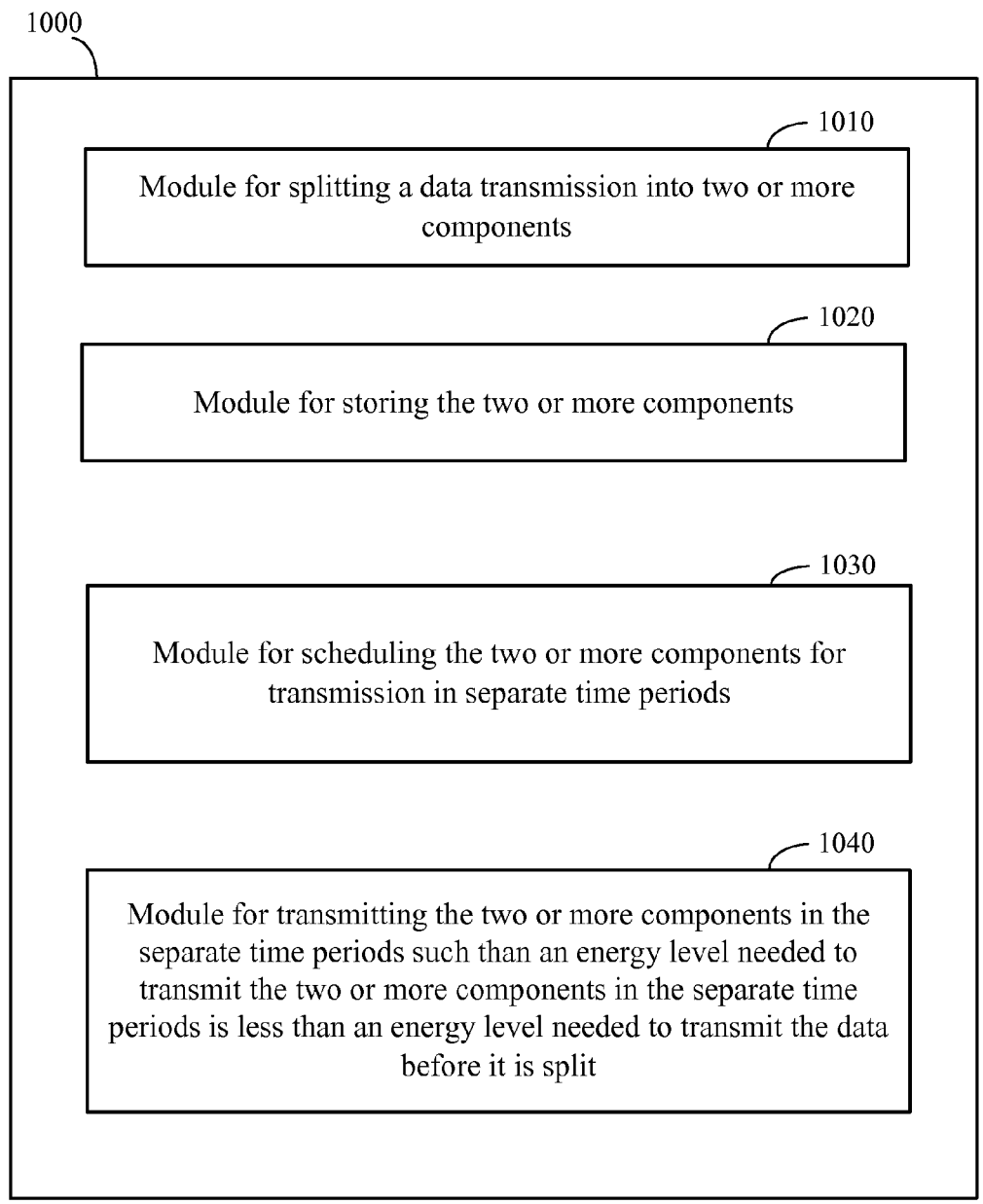
FIG. 10 is a block diagram of an exemplary embodiment including an individual user equipment device with various functional modules.

FIG. 10 is a conceptual block diagram illustrating an example of the functionality of an implementation of the subject matter of the present disclosure. FIG. 10 illustrates a conceptual mobile device 1000 that includes a module for splitting 1010, a module for storing 1020, a module for scheduling 1030, and a module for transmitting 1040. In various embodiments, mobile device 1000 corresponds to the embodiments described above.

Each of the modules 1010, 1020, 1030, and 1040 may represent aspects of the above-described embodiments. Module 1010 provides the functionality of splitting data to be transmitted into two or more components. Module 1020 provides the functionality of storing the two or more components split by module 1010. Module 1030 provides the functionality of scheduling the two or more components for transmission in separate time periods. Module 1040 provides the functionality of transmitting the two or more components in the separate time periods such than an energy level needed to transmit the two or more components in the separate time periods is less than an energy level needed to transmit the data before it is split. Any or all of modules 1010, 1020, 1030 and/or 1040 may be implemented using the techniques in the embodiments described above.

As used above, the term "machine-readable medium" refers to any medium containing code or instructions that can be read or executed by a processor. Such a medium may take many forms, including, but not limited to, non-volatile media (e.g., magnetic disks or optical disks), volatile media (e.g., dynamic memory such as Random Access Memory), wired media (e.g., coaxial cables, copper wire, including the wires that comprise a bus, and fiber optics), wireless media (e.g., radio frequency, and other media in the electromagnetic spectrum) and other forms of machine-readable media. Example of machine-readable media include a floppy disk, a hard disk, magnetic tape, a CD-ROM, DVD, and computer-readable media in general.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of conserving transmission energy for a wireless terminal that transmits data packets, the method comprising:
   determining whether a size of a data packet exceeds a threshold;
   splitting the data packet into two or more sub packets in response to determining that the size of the data packet exceeds the threshold, wherein a size of each of the two or more sub packets is less than the threshold;
   scheduling each of the two or more sub packets for transmission in two or more data channel time slots;
   determining whether at least one of the two or more data channel time slots is not concurrent with at least one predetermined control channel time slot configured to transmit control information;
   rescheduling at least one of the two or more sub packets to a different data channel time slot that is concurrent to a predetermined control channel time slot in response to determining that the at least one of the two or more data channel time slots is not concurrent with at least one predetermined control channel time slot; and
   transmitting the two or more sub packets in the two or more data channel time slots.

2. The method of claim 1, wherein a data transmission standard for transmitting the two or more sub packets is a 3GPP standard.

3. The method of claim 1, wherein rescheduling the at least one of the two or more sub packets comprises delaying the at least one of the two or more sub packets from a designated non-transmission period to at least one data channel time slot in a predetermined transmission period.

4. The method of claim 1, wherein rescheduling the at least one of the two or more sub packets comprises advancing the at least one of the two or more sub packets from a designated non-transmission period to at least one data channel time slot in a predetermined transmission period.

5. The method of claim 1, wherein the threshold corresponds to a size threshold to trigger a requirement to transmit at a higher energy level, in accordance with a data transmission standard.

6. A non-transitory machine-readable medium having machine-executable instructions for execution by a processor for conserving transmission energy for a wireless terminal that transmits data packets within at least one of a plurality of time slots, the executed instructions performing:
   determining whether a size of a data packet exceeds a threshold;
   splitting the data packet into two or more sub packets in response to determining that the size of the data packet exceeds the threshold, wherein a size of each of the two or more subpackets is less than the threshold;
   scheduling each of the two or more sub packets for transmission in two or more data channel time slots;
   determining whether at least one of the two or more data channel time slots is not concurrent with at least one predetermined control channel time slot configured to transmit control information;
   rescheduling at least one of the two or more sub packets to a different data channel time slot that is concurrent to a predetermined control channel time slot in response to determining that the at least one of the two or more data channel time slots is not concurrent with at least one predetermined control channel time slot; and
   transmitting the two or more sub packets in the two or more data channel time slots.

7. The non-transitory machine-readable medium of claim 6, wherein a data transmission standard for transmitting the two or more sub packets is a 3GPP standard.

8. The non-transitory machine-readable medium of claim 6, wherein rescheduling the at least one of the two or more sub packets comprises delaying the at least one of the two or more sub packets from a designated non-transmission period to at least one data channel time slot in a predetermined transmission period.

9. The non-transitory machine-readable medium of claim 6, wherein rescheduling the at least one of the two or more sub packets comprises advancing the at least one of the two or more sub packets from a designated non-transmission period to at least one data channel time slot in a predetermined transmission period.

10. The non-transitory machine-readable medium of claim 6, wherein the threshold corresponds to a size threshold to trigger a requirement to transmit at a higher energy level, in accordance with a data transmission standard.

11. A wireless terminal device for conserving transmission energy and that transmits a data channel, the wireless terminal device comprising:
    means for processing at least one data packet using a selector, wherein the selector comprises an input port and an output port, is configured to:
       receive the at least one data packet through the input port from a machine-readable medium;
       determine whether a size of the at least one data packet exceeds a threshold;
       split the at least one data packet into two or more sub packets in response to determining that the size of the at least one data packet exceeds the threshold, wherein a size of each of the two or more sub packets is less than the threshold;
       determine whether at least one of the two or more data channel time slots is not concurrent with at least one predetermined control channel time slot configured to transmit control information;
       send, through the output port, at least one of the two or more sub packets to at least one of a plurality of queues to reschedule the at least one of the two or sub packets to a different data channel time slot that is concurrent with at least one predetermined control channel time slot in response to determining that the at least one of the two or more data channel time slots is not concurrent with at least one predetermined control channel time slot; and
    means for transmitting the two or more sub packets in the two or more data channel time slots.

12. The wireless terminal device of claim 11, wherein a data transmission standard utilized by the means for transmitting the two or more sub packets is a 3GPP standard.

13. The wireless terminal device of claim 11, wherein the selector is configured to send the at least one of the two or more sub packets to the at least one of the plurality of queues, to delay the at least one of the two or more sub packets from a designated non-transmission period to at least one data channel time slot in a predetermined transmission period.

14. The wireless terminal device of claim 11, wherein the selector is configured to send the at least one of the two or more sub packets to the at least one of the plurality of queues, to advance the at least one sub packet from a designated non-transmission period to at least one data channel time slot in a predetermined transmission period.

15. The wireless terminal device of claim 11, wherein the threshold corresponds to a size threshold to trigger a requirement to transmit at a higher energy level, in accordance with a data transmission standard.

16. A wireless terminal device configured to transmit a data channel and for conserving transmission energy, the wireless terminal device comprising:
    a processor configured to process at least one data packet using a selector, wherein the selector comprises an input port and an output port, is configured to:
        receive the at least one data packet through the input port from a machine-readable medium;
        determine whether a size of the at least one data packet exceeds a threshold;
        split the at least one data packet into two or more sub packets in response to determining that the size of the data packet exceeds the threshold, wherein a size of each of the two or more sub packets is less than the threshold;
        determine whether at least one of the two or more data channel time slots is not concurrent with at least one predetermined control channel time slot configured to transmit control information;
        send, through the output port, the at least one of the two or more sub packets to at least one of a plurality of queues to reschedule at least one of the two or more sub packets to a different data channel time slot that is concurrent with at least one predetermined control channel time slot in response to determining that the at least one of the two or more data channel time slots is not concurrent with at least one predetermined control channel time slot; and
    a transmission module configured to transmit the two or more sub packets in the two or more data channel time slots.

17. The wireless terminal device of claim 16, wherein a data transmission standard utilized by the transmission module is a 3GPP standard.

18. The wireless terminal device of claim 16, wherein the selector is configured to send the at least one of the two or more sub packets to the at least one of the plurality of queues, to delay the at least one sub packet from a designated non-transmission period to at least one data channel time slot in a predetermined transmission period.

19. The wireless terminal device of claim 16, wherein the selector is configured to send the at least one of the two or more sub packets to the at least one of the plurality of queues, to advance the at least one sub packet from a designated non-transmission period to at least one data channel time slot in a predetermined transmission period.

20. The wireless terminal device of claim 16, wherein the threshold corresponds to a size threshold to trigger a requirement to transmit at a higher energy level, in accordance with a data transmission standard.

* * * * *